United States Patent
Stringfellow et al.

[11] Patent Number: 5,997,161
[45] Date of Patent: Dec. 7, 1999

[54] BLACK LIGHT INSTRUMENT CLUSTER ASSEMBLY

[75] Inventors: Steven Allen Stringfellow, Oakland Township; Peter L. Kalajian, deceased, late of Rochester Hills, both of Mich., by Loretta Kathryn Kalajian, legal representative

[73] Assignee: General Motors Corporation, Detroit, Mich.

[21] Appl. No.: 08/987,221

[22] Filed: Dec. 9, 1997

[51] Int. Cl.⁶ ....................................................... F21Q 1/00
[52] U.S. Cl. .............................. 362/489; 362/84; 362/26; 362/30
[58] Field of Search ................................ 362/489, 84, 26, 362/29, 30, 31

[56] References Cited

U.S. PATENT DOCUMENTS

| | | | |
|---|---|---|---|
| 2,782,294 | 2/1957 | Tinich | 362/27 |
| 4,561,042 | 12/1985 | Webner et al. | 362/30 |
| 4,841,155 | 6/1989 | Ushida et al. | 362/84 X |
| 4,991,537 | 2/1991 | Muramatsu | 362/84 X |
| 5,173,682 | 12/1992 | Murphy et al. | 340/461 |
| 5,198,936 | 3/1993 | Stringfellow | 359/831 |
| 5,227,767 | 7/1993 | Tanaka | 362/27 X |
| 5,523,922 | 6/1996 | Kato | 362/84 X |

*Primary Examiner*—Laura K. Tso
*Attorney, Agent, or Firm*—Charles E. Leahy; Kathryn A. Marra

[57] ABSTRACT

An instrument cluster assembly includes a light source for emitting black light and an instrument cluster display including at least one graphic feature that is illuminable by black light. The invisible black light illuminates only the graphic features when contacted by the black light from the light source without illuminating the surrounding portions of the instrument cluster display. Preferably, the light source includes first and second light sources positioned on opposite sides of the instrument cluster display. The light sources are each a single bulb for emitting ultraviolet light. The light sources are positioned between reflectors and the instrument cluster display such that the reflectors are positioned for redirecting black light initially emitted towards the reflector onto the instrument cluster display. The graphic features are preferably made of a phosphoric material.

17 Claims, 3 Drawing Sheets

BLACK LIGHT INSTRUMENT CLUSTER ASSEMBLY

TECHNICAL FIELD

This invention relates to an instrument cluster assembly for use in a motor vehicle.

BACKGROUND OF THE INVENTION

It is well known in the prior art to provide an instrument cluster assembly that provides information to the driver regarding speed, fuel level, and an unlimited variety of other information. Depending on the desired design effect, it is commonly known to provide this information in either a traditional analogue form, including gauges having dials with pointers, or alternately in a form having a digital appearance. Most conventional analogue instrument cluster displays include gages that are backlit with an array of incandescent bulbs or acrylic light pipes that are placed behind the cluster. These bulbs require a certain amount of air for cooling, thus driving a certain space requirement or volume requirement for packaging the incandescent bulbs in the instrument cluster panel. With the incandescent bulbs, it is difficult to completely eliminate bright spots and to get an even illumination of the instrument cluster graphics. Typically, the pointers used in analogue clusters are made of relatively costly, clear, acrylic light pipes which project light along the length of the pointers. Thus, a small amount of light can leak beneath the pointer and cause a glow beneath the pointers. In addition, the pointers are limited in shape and size since they must be wide enough to accommodate the light pipe, thus dictating the use of relatively straight pointers with relatively wide tips. Furthermore, the pointers are limited in color, based on the optical limitations of the transparency of the light pipes. Light pipes also have the limitation of requiring the graphics to remain on one plane.

Another method of lighting an analogue instrument cluster is to front-flood the instrument cluster with visible light provided by a plurality of incandescent or fluorescent bulbs placed above and below the instrument cluster. The front-flood method has the limitations of requiring a large amount of bulbs and a relatively large packaging space. In addition, the front-flooding of the instrument cluster by visible light illuminates the entire cluster, not just the informational features, giving a less attractive appearance than the backlit version.

Furthermore, instrument clusters of the prior art have many separate components that must be assembled directly to the instrument panel at the vehicle assembly location. This assembly process can be cumbersome.

As vehicle manufacturers progress in vehicle designs, new and innovative looks are desirable for the vehicle interior. In the area of instrumentation, design goals include providing economical instrumentation that is easy to read, less bulky, less heavy, easy to assembly to the vehicle, and more flexible in design. Obtaining some or all of these goals opens the opportunity for more aesthetically pleasing designs of instrument cluster displays.

SUMMARY OF THE INVENTION

The present invention provides alternatives and advantages over the prior art by providing an instrument cluster assembly that is easy to read, lightweight, less costly, less bulky, and has fewer components and greater design flexibility than instrument cluster assemblies of the prior art. Furthermore, the present invention requires fewer bulbs and less energy consumption than prior art instrument cluster assemblies.

It is an object of the invention to provide an instrument cluster assembly which selectively illuminates the graphic features of the instrument cluster display without the illumination of any surrounding portions of the instrument cluster display. Preferably, this is accomplished without the use of visible light, but instead by the use of black light. It is a further object of the invention to provide an instrument cluster assembly which requires less packaging space than instrument cluster assemblies of the prior art. Advantageously, the use of black light requires less power and fewer bulbs generating less heat than the prior art for reduced packaging space. It is a further object of this invention to provide an instrument cluster assembly having clear, crisp night time lighting without any shadows or glows. It is also an object of this invention to provide an evenly illuminated instrument cluster display.

Yet another object of the invention is to provide a multi-dimensional or "holographic" effect on the instrument cluster display at night by the physical placement of instrument gages on multiple planes as enabled by the use of black light sources. Advantageously, the present invention provides the enablement of an unlimited amount of colors, shapes, sizes, and designs of graphic information displays in a cost effective manner. It is a further goal of this invention to provide an instrument cluster assembly that is a compact module for easy assembly as a single unit to the vehicle.

These advantages and alternatives are accomplished by providing an instrument cluster assembly for use in a vehicle. The instrument cluster assembly includes a light source for emitting black light and an instrument cluster display including at least one graphic feature that is illuminable by black light. Thus, the invisible black light illuminates only the graphic features when contacted by the black light from the light source without illuminating the surrounding portions of the instrument cluster display. Preferably, the light sources are each a single bulb for emitting ultraviolet light. The assembly preferably includes at least one reflector. The light source is positioned between the reflector and the instrument cluster display such that the reflector is positioned for redirecting black light initially emitted towards the reflector onto the instrument cluster display, preferably in the center of the instrument cluster display furthest away from the light source. The graphic features are preferably made of a phosphoric material.

According to other aspects of the invention, the light source preferably includes first and second light sources that are positioned on opposite sides of the instrument cluster display and laterally spaced apart from and in front of the graphic features. The assembly also preferably includes first and second reflectors positioned adjacent the first and second light sources, respectively, for redirecting black light initially emitted towards the reflectors onto the instrument cluster display. The reflectors are aspheric, having different curvatures in the horizontal and vertical directions. The instrument cluster display preferably has a three dimensional effect by having a plurality of graphic features located on at least two or more different planes.

In accordance with other preferred aspects of the invention, the instrument cluster assembly includes a cluster lens covering the instrument cluster display. The cluster lens preferably has an aspheric shape and is made of a material having properties that inhibit the transfer of black light through the cluster lens. The instrument cluster display preferably includes at least one gage with at least one of the graphic features being a pointer centrally mounted on the gage and extending through the center of the gage as enabled by the use of remote black light sources, rather than light pipes. Furthermore, the instrument cluster display includes at least one gage and an outer bezel surrounding the gage. The bezel is angled inwardly for permitting the black light to contact the center of the gage and eliminate shadows on the gage. Preferably, each of the light sources illuminates more than half of the instrument cluster display for elimination of shadows.

The assembly also preferably includes a structural retainer attached to the instrument cluster display and a cluster lens attached to the retainer. The assembly includes lighting modules mounted between the retainer and the instrument cluster display, with the lighting modules housing the light sources and including at least one reflector therein for redirecting light initially directed towards the reflector back towards the instrument cluster display. The assembly is preferably formed as a single integral unit prior to attachment to the vehicle.

BRIEF DESCRIPTION OF THE DRAWINGS

The present invention will now be described, by way of example, with reference to the accompanying drawings in which.

DESCRIPTION OF THE PREFERRED EMBODIMENT

Figure 1:
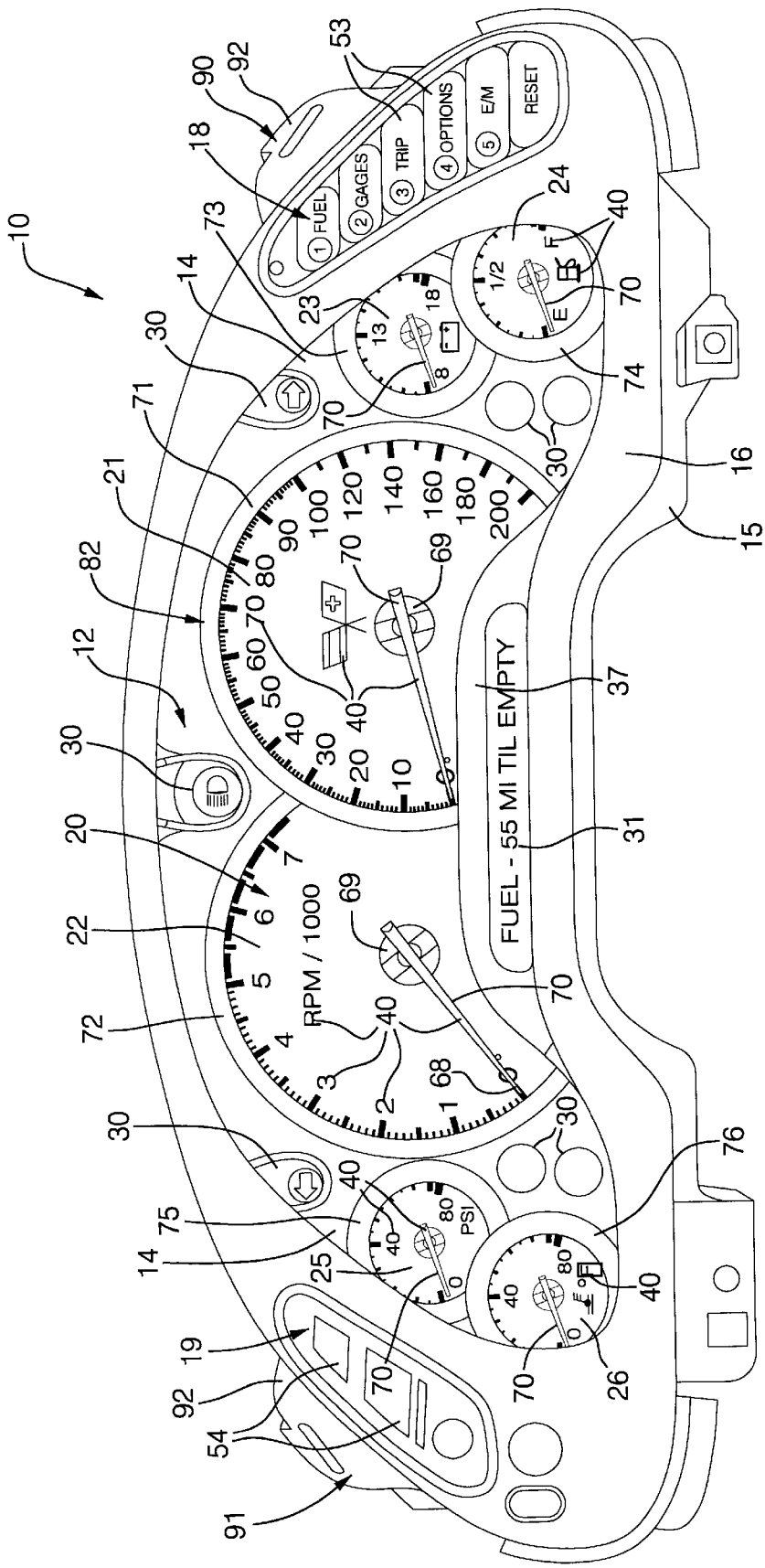
FIG. 1 is a front view of the instrument cluster assembly in the assembled condition.

Referring to FIG. 1, an instrument cluster assembly is generally designated as 10. Preferably, the instrument cluster assembly 10 is assembled as a compact module for assembly into an instrument panel of a vehicle as a single unit. Advantageously, the instrument cluster assembly 10 uses first and second black light sources 50, 51 associated with first and second reflectors 60, 61 for evenly illuminating multiple graphic features 40 on an instrument cluster display 20, as will be described in detail.

Figure 2:
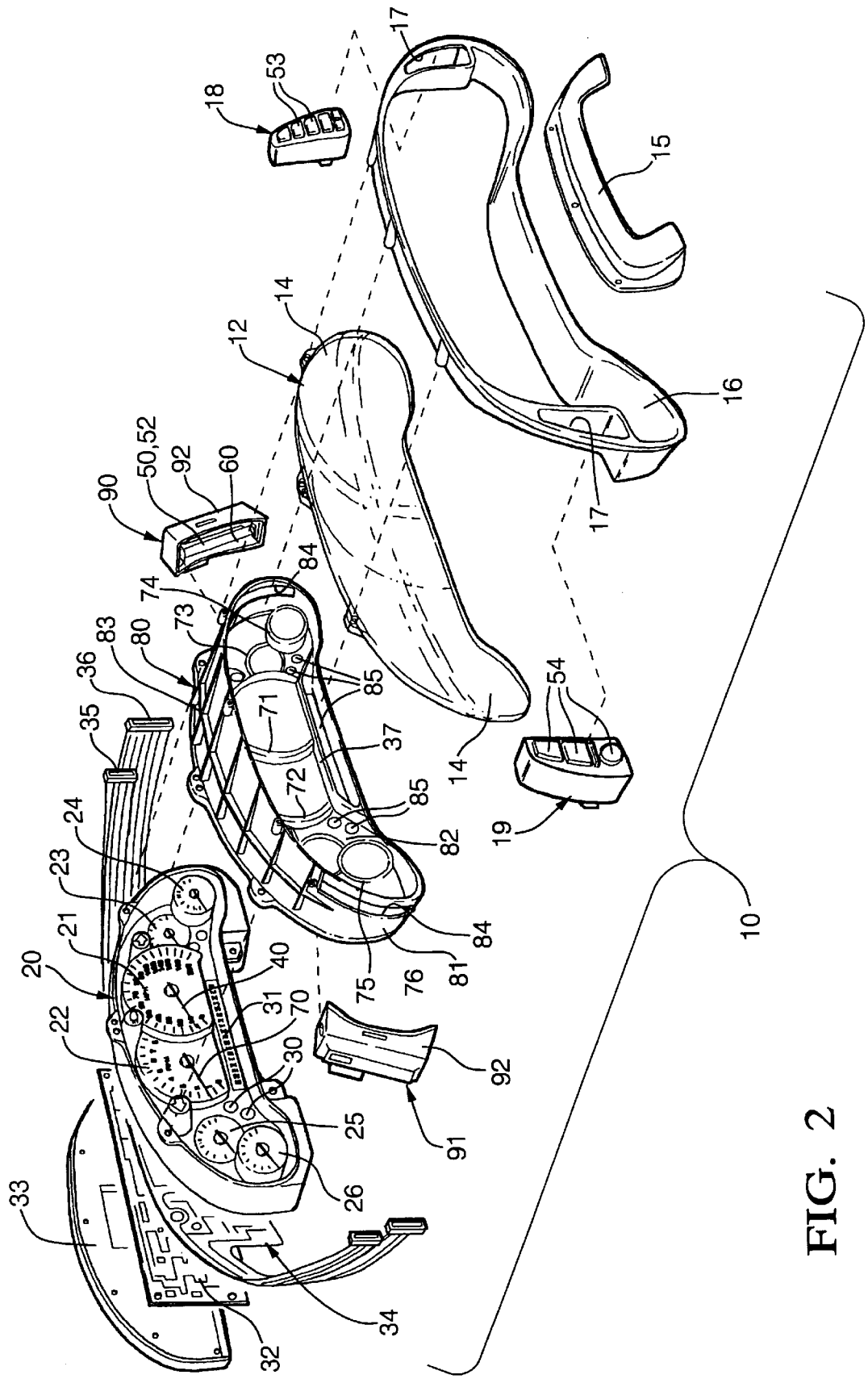
FIG. 2 is an exploded perspective view of the instrument cluster assembly.

As best shown in FIGS. 1 and 2, the instrument cluster assembly 10 includes the instrument cluster display, generally designated as 20. As best shown in FIG. 1, the instrument cluster display 20 includes a plurality of gages 21, 22, 23, 24, 25, 26 located on a plurality of fore/aft planes. The plurality of gages 21, 22, 23, 24, 25, 26 contain a plurality of graphic features 40, including pointers 70, that are illuminated by the black light sources 50, 51, as described further hereinafter. In addition, the instrument cluster display 20 may also include some traditional informational features, such as numerous backlit telltale lights 30 and a multi-character vacuum fluorescent display information center 31 which are selectively lit for certain conditions.

Figure 3:
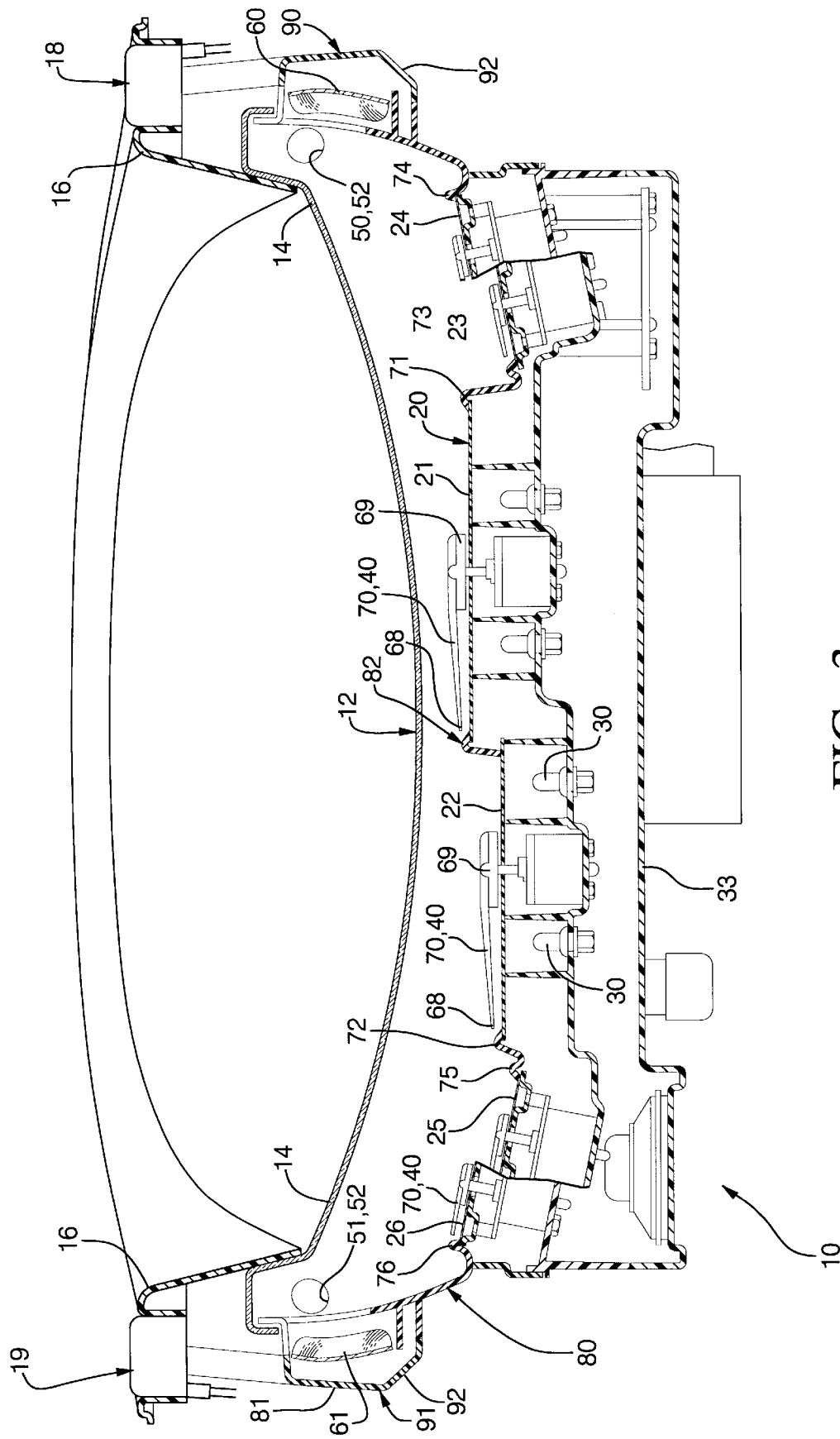
FIG. 3 is a cross-sectional view of the instrument cluster assembly taken along line 3—3 of FIG. 1.

The first main gage 21 is preferably a speedometer and the second main gage 22 is preferably a tachometer. The first and second main gages 21, 22 are preferably overlapped and seated on different fore/aft planes, as best shown in FIG. 3. The gages 21, 22 are preferably generally centered on the instrument cluster display 20. The first gage 21 is seated on a plane closer to the vehicle driver than the second gage 22.

The display 20 also includes upper and lower right side gages 23, 24 for measuring voltage and fuel level, respectively. The instrument cluster display 20 further includes upper and lower left side gages 25, 26 for measuring engine oil pressure and temperature, respectively. The right and left side gages 23, 24, 25, 26 are preferably smaller than the central main gages 21, 22 and are each angled inwardly towards the center of the instrument cluster display 20 for easy viewing by a vehicle driver and to prevent a parallax effect. Furthermore, the upper gages 23, 25 are located further away from the driver in the fore/aft direction than the lower gages 24, 26. In addition, the right and left side gages 23, 24, 25, 26 are located on fore/aft planes that differ from the fore/aft planes of the central first and second main gages 21, 22. Advantageously, the gages 21, 22, 23, 24, 25, 26 on the instrument cluster display 20 provide a three-dimensional effect when viewed on the multiple planes. At night, the three-dimensional effect becomes holographic as it appears that the gages 21, 22, 23, 24, 25, 26 are floating on different planes. This physical three-dimensional effect is enabled by the use of black light sources 50, 51 on opposite sides of the instrument cluster display 20 which prevent the shadows and glows necessarily present in the prior art. Furthermore, the angling and the multi-planar positioning of the gages 21, 22, 23, 24, 25, 26 is also enabled by the use of the two side mounted black lights sources 50, 51 spaced apart from the instrument cluster display 20, instead of multiple light pipes or incandescent bulbs located directly on the gages thereby making this type of three-dimensional arrangement impractical in the prior art.

It will be appreciated that the information on the gages 21, 22, 23, 24, 25, 26 is merely exemplary and that any information may be displayed on the various gages. It will further be appreciated that the arrangement and number of gages 21, 22, 23, 24, 25, 26 is also exemplary, although it is preferred that there are multiple gages on multiple planes. It will further be appreciated that the gages need not be dial-type, but may be in any format in which information is to be displayed to the driver. To allow the light sources 50, 51 to reach the central first and second gages 21, 22, it is also preferred that the right and left side gages 23, 24, 25, 26 are not located in front of the central main gages 21, 22.

It is noted that the forward and rearward directions are determined relative to the instrument cluster assembly 10, such that the instrument cluster display 20 will be referenced as facing forward with the first gage 21 being the furthest forward of the gages, even through the display 20 would be facing rearward relative to the vehicle.

Each of the gages 21, 22, 23, 24, 25, 26 includes a plurality of graphic features 40 including numbers, tick marks, letters and other graphic illustrations, including pointers 70, as desired. The graphic features 40 are preferably made from phosphoric ink or other phosphoric materials which are illuminable by black light. In addition, each gage 21, 22, 23, 24, 25, 26 preferably includes a pointer 70 mounted on a central knob 69 on each of the gages 21, 22, 23, 24, 25, 26. The pointers 70 are preferably made of a molded plastic material which is made of or is coated by a phosphoric substance that is illuminable by black light. Advantageously, the graphic features 40, including the pointers 70, can be of virtually any shape and size outlined by the phosphoric material since the black light sources 50, 51 are remotely located to the sides of the instrument cluster display 20. Advantageously, the pointers 70 can extend through the center of the knobs 69 since the pointers 70 are not formed by light pipes. In addition, the pointers 70 can include sharply pointed ends 68 while still being illuminated, which was not possible with the pointers formed by light pipes. In addition, the graphic features 40, including the pointers 70, can be made of virtually any color which is available in the phosphoric material and which also provides good visibility and contrast in daytime lighting.

The graphic features 40 shown, including the pointers 70, may be of virtually any configuration and are exemplary only. It will be appreciated that the side black lighting permits the pointers to even be made in the shape of cars, if desired. Thus, it will be appreciated that the use of phosphoric material illuminated by remotely-located side black light sources 50, 51 enables a limitless possibility of easily executed design options that were not previously possible.

As best shown in FIG. 2, the instrument cluster assembly 10 includes a right lighting module 90 and a left lighting module 91. The lighting modules 90, 91 each include a housing 92 preferably integrally molded from a plastic material. The right and left lighting modules 90, 91 include right and left reflectors 60, 61, respectively, mounted on the housings 92. The reflectors 60, 61 are made of any reflective material, such as lightweight aluminum. The reflectors 60, 61 are aspheric with different curvatures horizontally and vertically. The curvatures of the aspheric reflectors 60, 61 are chosen to collect ultraviolet energy from the light sources 50, 51 and focus the black light into specific hard-to-reach places on selected gages of the instrument cluster display 20, preferably being the main central gages 21, 22 which are furthest away from the light sources 50, 51 in the center of the instrument cluster display 20. For example, the left reflector 61 preferably concentrates light on the "red zone" on the tachometer of the second gage 22. The right reflector 60 preferably concentrates light on the 10–20 mph zone on the speedometer of the first gage 21. It will be appreciated that the reflectors 60, 61 are preferably used to redirect light which initially is directed away from the instrument cluster display 20 onto the central portion of the instrument cluster display, furthest away from the light sources 50, 51, as described further below. The reflectors 60, 61 help to ensure even illumination of all of the graphic features 40 on the instrument cluster display 40.

The right and left light sources 50, 51 are mounted in the right and left lighting modules, 90, 91, respectively. The light sources 50, 51 are each preferably a single ultraviolet (UV) bulb that emits invisible black light having a wavelength just beyond the violet in the visible spectrum. Advantageously, the UV bulbs 52 for emitting black light require less energy and are less effected by vibration than the typical incandescent bulbs or light pipes used in the prior art. Also advantageously, the black light bulbs 52 generate less heat and require less packaging space for air cooling. In addition, the bulbs 52 used for the light sources 50, 51 are relatively small and easy to package.

It will be appreciated that the bulbs 52 of the light sources 50, 51 preferably emit the black light in 360 degrees or in all directions from the cylindrical bulbs 52. As best shown in FIG. 2, the light sources 50, 51 are preferably each located on opposite sides of the instrument cluster display 20 and in front of the instrument cluster display 20 towards the vehicle driver in the fore/aft direction. Thus, the light sources 50, 51 are preferably positioned in front of and to the side of the instrument cluster display 20 and are remotely spaced from the graphic features 40. The light sources 50, 51 may be securely mounted by placing rubber grommets (not shown) on upper and lower ends of each of the bulbs 52. The grommets can use used to securely snap-fit the bulbs 52 to either the housings 92 or the cluster retainer 80. The grommets keep the bulbs 52 secure from vibration and the housings 92 and retainer 80 protect the bulbs 52 from damage. In addition, a thin metallic mesh (not shown) may be provided around each of the bulbs 52 for warming up the bulbs 52 during cold temperatures and for suppressing electronic noise from the bulbs 52.

The light sources 50, 51 directly cast light at shallow angles onto the gages 21, 22, 23, 24, 25, 26 of the instrument cluster display 20. The light sources 50, 51 also cast reflected light across the instrument cluster display 20 as redirected by the reflectors 60, 61. Accordingly, the reflectors 60, 61 are positioned to the outside of the light sources 50, 51 such that the light sources 50, 51 are generally positioned between the instrument cluster display 20 and the reflectors 60, 61.

The aspheric reflectors 60, 61 are suitably curved to capture light from the light sources 50, 51 which is initially directed away from the instrument cluster display 20 and reflect it back onto the instrument cluster display 20 such that all of the light emitted from the light sources 50, 51 is utilized to light the graphic features 40. The aspheric reflectors 60, 61 are also curved in the vertical direction to avoid lines on the graphic features 40. The opposing light sources 50, 51 cast enough light across the instrument cluster display 20 to fill in each other's shadows. Accordingly, the light paths of the light sources 50, 51, preferably cross and each of the light sources 50, 51 reaches across more than half of the instrument cluster display 20.

In operation, the black light from the light sources 50, 51 shines on the graphic features 40, including the pointers 70, such that the phosphoric material is illuminated by the black light. The vehicle driver is then able to view the color of the illuminated phosphoric material in the visible wave length. Since the black or UV light is invisible, the driver only sees the illuminated graphic features 40 which contain the phosphoric material. Thus, the driver has a clean, crisp view of the graphic features 40 without any shadows or light leaks. In addition, the physical placement of the gages 21, 22, 23, 24, 25, 26 on multiple planes creates a three-dimensional, holographic-type effect when the illuminated instrument cluster display 20 is viewed by the driver in darkness. This creates a dramatic visual effect of three-dimensional floating gages 21, 22, 23, 24, 25, 26 within the instrument cluster assembly 20 which are easy to read. Everything, but the graphic features 40, is virtually invisible at night. Advantageously, the graphic features 40, including the pointers 70, can be designed with an almost limitless variety of shapes and locations, as long as they are at an angle that can be reached by the black light form the side light sources 50, 51.

Referring to FIG. 2, the instrument cluster assembly 10 further includes a structural retainer 80 which is preferably integrally molded of plastic. The retainer 80 includes an outer shell 81 which preferably includes ribs 83 for strengthening. The shell 81 also includes attachment side openings 84 for attachment of the lighting modules 90, 91 and the light sources 90, 91. The retainer 80 includes a mask portion 82 which includes a plurality of bezels 71, 72, 73, 74, 75, 76 for surrounding each of the respective gages 21, 22, 23, 24, 25, 26 when the retainer 80 is assembled to the instrument cluster display 20. As best shown in FIG. 3, the bezels 71, 72, 73, 74, 75, 76 are each angled inwardly towards the respective gages 21, 22, 23, 24, 25, 26 which they surround to permit the black light to reach all of the graphic features 40, including those on the center of the gages 21, 22, 23, 24, 25, 26. For the elimination of shadows, the bezels 71, 72, 73, 74, 75, 76 are preferably each angled in the same direction as the light being cast from the bulbs 52 onto their respective gages 21, 22, 23, 24, 25, 26 such that the light reaches the center of the gages 21, 22, 23, 24, 25, 26. The retainer 80 also includes a plurality of apertures 85 through which taletell lights 30 and the vacuum fluorescent display 31 can be viewed. A bridge portion 37 is preferably provided on the retainer 80 for overlying the vacuum fluorescent display information center 31 to prevent its phosphors from becoming activated by the UV energy.

Referring to FIGS. 2 and 3, the instrument cluster assembly 10 further includes an aspheric cluster lens 12 which is curved different amounts in the vertical and horizontal directions. As best seen in FIG. 3, the cluster lens 12 has left and right side edges 14 which are curved forward and away from the instrument cluster display 20 with the center of the lens 20 being closest to the instrument cluster display 20. Advantageously, this curvature of the side edges 14 away from the instrument cluster display 20 allows the light sources 50, 51 to be positioned to the side of and in front of the instrument cluster display 20 on opposite sides. The cluster lens 12 is preferably made of a clear acrylic material. Most preferably, the cluster lens 12 includes a black light or UV inhibitor in the material such that black light cannot pass out through the cluster lens 12 into the passenger compartment, but is absorbed or reflected. Thus, only visible light from the illuminated graphic features 40 exits through the cluster lens 12. In addition, the aspheric cluster lens 12 provides reflections off the interior of the lens 12 to enhance the lighting effect. The UV inhibitive properties of the lens 12 also helps to prevent the acrylic material from degrading.

The instrument cluster assembly 10 is closed out by a cluster trim piece 16, which is preferably integrally molded of a plastic material. Opposite sides of the cluster trim piece 16 include elongated pod openings 17 for receiving a switch pod 18 or a dimming pod 19 therein. As best shown in FIGS. 1 and 2, the switch pod 18 on the right side of the assembly 20 includes a plurality of momentary low current switches 53. The dimming pod 19 on the left side may optionally be included with dimming controls 54 for interior lighting or heads-up display. It will be appreciated that although not shown, the pods 18, 19 could also be backlit by the same black light sources 50, 51 if light path openings were provided in the proper locations. Advantageously, the pods 18, 19 together with the retainer 80, cluster lens 12 and lighting housings 92 provide a protective surrounding for the bulbs 52 and also hide the light sources 50, 51 and reflector 60, 61 from the driver's view.

As shown in FIG. 3, a steering column trim gasket 15 may be used for closing out the area between the instrument cluster assembly 10 and the steering column (not shown). The gasket 15 is preferably made of a molded rubber material. In addition, the assembly 10 includes a connector member, generally designated as 34, including right and left UV lighting connectors 35, 36 for supplying power to the right and left lighting modules 90, 91, respectively. The connector member 34 also includes a right switch pod connector 36 for connection to the switch pod 18 and a left dimming pod connector for attachment to the dimming pod 19. The instrument cluster assembly 20 also includes a main circuit board 32 and a protective rear cover 33 overlying the main circuit board 32. The connector member 34, the main circuit board 32, and the rear cover 33 are all positioned behind the instrument cluster display 20.

It will be appreciated that the instrument cluster assembly 10 is advantageously assembled as a module completely separate and independent from the vehicle for later insertion into the vehicle instrument panel as a single modular unit. The instrument cluster assembly 10 is easily assembled by unidirectional attachment of the rear cover 33, main circuit board 32, connector assembly 34, instrument cluster display 20, structural retainer 80, cluster lens 12, cluster trim piece 16, and trim gasket 15. These components are suitably joined together by fasteners (not shown). In addition, the pods 18, 19 are mounted within the pod openings 17 on the trim piece 16 and the light modules 90, 91 are preassembled and mounted between the retainer 80 and instrument cluster display 20. One or more of the rear cover 33, retainer 80, and trim piece 12 preferably include integrally molded clips for snap-fitted attachment of the entire instrument cluster assembly 10 to suitable mating fasteners on the instrument panel of the vehicle.

It will be understood that a person skilled in the art may make modifications to the preferred embodiment shown herein within the scope and intent of the claims. For example, although the cluster lens 12 is shown as a separate component, it will be appreciated that the lens 12 could alternately be integrated with the trim piece 12 or retainer 80 by vibration welding or by a two-shot molding process. It will further be appreciated that the multi-plane arrangement and type of graphic features 40, pointers 70, and gages 21, 22, 23, 24, 25, 26 are merely exemplary and many other arrangements are possible as enabled by the design flexibility offered by the black light sources 50, 51 mounted to the sides and in front of the instrument cluster display 20.

While the present invention has been described as carried out in specific embodiments thereof, it is not intended to be limited thereby but is intended to cover the invention broadly within the scope and spirit of the appended claims.

What is claimed is:

1. An instrument cluster assembly for use in a vehicle, the instrument cluster assembly comprising:
   a light source for emitting black light;
   an instrument cluster display; and
   a plurality on graphic features located on the instrument cluster display, the graphic features being located on at least two different planes and being illuminable by black light;
   whereby the graphic feasters becomes illuminated when contacted by the black light from the light source.

2. The instrument cluster assembly of claim 1 wherein the assembly includes at least one reflector and wherein the light source is positioned between the reflector and the instrument cluster display and wherein the reflector is positioned for redirecting black light initially emitted towards the reflector onto the instrument cluster display.

3. The instrument cluster assembly of claim 2 wherein the reflector directs the black light emitted from the light source generally towards a center of the instrument cluster display.

4. The instrument cluster assembly of claim 1 wherein the graphic features are made of a phosphoric material.

5. The instrument cluster assembly of claim 1 wherein the light source includes first and second light sources, the light sources being positioned on opposite sides of the instrument cluster display and laterally spaced apart from and in front of the graphic features.

6. The instrument cluster assembly of claim 1 wherein the light source includes first and second light sources, the light sources being positioned on opposite sides of the instrument cluster display.

7. The instrument cluster assembly of claim 6 wherein the assembly includes first and second reflectors positioned adjacent the first and second light sources, respectively, for redirecting black light initially emitted towards the reflectors onto the instrument cluster display.

8. The instrument cluster assembly of claim 7 wherein the reflectors direct the black light emitted from the light source generally towards a center of the instrument cluster display.

9. The instrument cluster assembly of claim 6 wherein the assembly includes reflectors positioned adjacent the light sources, the light sources being positioned between the reflectors and the instrument cluster display.

10. The instrument cluster assembly of claim 9 wherein the reflectors are aspheric.

11. The instrument cluster assembly of claim 9 wherein the reflectors are curved different amounts in horizontal and vertical directions.

12. The instrument cluster assembly of claim 1 wherein the light source includes first and second light sources, the light sources being positioned on opposite lateral sides of the instrument cluster display.

13. The instrument cluster assembly of claim 1 wherein the instrument cluster assembly includes a cluster lens covering the instrument cluster display, the cluster lens being made of a material having properties that inhibit the transfer of black light through the cluster lens.

14. The instrument cluster assembly of claim 1 wherein the instrument cluster assembly includes an aspheric cluster lens covering the instrument cluster display and wherein the cluster lens includes left and right sides which are curved outwardly away from the instrument cluster display and wherein the light source includes first and second light sources that are positioned between the left and right sides of the cluster lens and the instrument cluster display, respectively.

15. The instrument cluster assembly of claim 1 wherein the instrument cluster display includes at least one gage and wherein at least one of the graphic features is a pointer centrally mounted on the gage and wherein the pointer extends through the center of the gage.

16. The instrument cluster assembly of claim 1 wherein the instrument cluster display includes at least one gage and an outer bezel surrounding the gage, the bezel being angled inwardly for permitting the black light to contact the center of the gage.

17. The instrument cluster assembly of claim 1 wherein the light source includes first and second light sources located on opposite sides of the instrument cluster display and wherein each of the light sources illuminates more than half of the instrument cluster display.

* * * * *